(12) United States Patent
Olson

(10) Patent No.: US 7,862,049 B2
(45) Date of Patent: Jan. 4, 2011

(54) GASKET AND METHOD OF FORMING A SEAL THEREWITH

(75) Inventor: Greg Olson, Canton, MI (US)

(73) Assignee: Federal Mogul World Wide, Inc., Southfield, MI (US)

( * ) Notice: Subject to any disclaimer, the term of this patent is extended or adjusted under 35 U.S.C. 154(b) by 234 days.

(21) Appl. No.: 11/405,306

(22) Filed: Apr. 17, 2006

(65) Prior Publication Data

US 2007/0241517 A1 Oct. 18, 2007

(51) Int. Cl.
*F16L 17/00* (2006.01)
(52) U.S. Cl. ............................... 277/650; 277/654
(58) Field of Classification Search ............... 277/920, 277/650–654, 598
See application file for complete search history.

(56) References Cited

U.S. PATENT DOCUMENTS

| | | | |
|---|---|---|---|
| 214,083 | A | 4/1879 | Beardmore |
| 311,707 | A | 2/1885 | Adams |
| 791,552 | A | 6/1905 | Hance |
| 1,068,585 | A | 7/1913 | Hettinger |
| 1,160,316 | A | 11/1915 | Paterson |
| 1,756,881 | A | 4/1930 | Reinz |
| 1,976,948 | A | 10/1934 | Lehon |
| 1,997,987 | A | 4/1935 | Victor, Jr. |
| 2,001,616 | A | 5/1935 | Klinger |
| 2,189,795 | A | 2/1940 | Hartbauer |
| 2,674,644 | A * | 4/1954 | Goodloe .................... 277/608 |
| 3,050,010 | A | 8/1962 | Thrap et al. |
| 3,126,440 | A | 3/1964 | Goodloe |
| 3,435,127 | A * | 3/1969 | Rose et al. ............... 174/94 R |
| 3,608,914 | A | 9/1971 | Harby |
| 4,373,735 | A * | 2/1983 | Morsbach et al. ........... 277/592 |
| 4,463,959 | A * | 8/1984 | Usher et al. ................. 277/608 |
| 4,529,257 | A * | 7/1985 | Goodman et al. ........... 439/271 |
| 4,537,458 | A * | 8/1985 | Worth ....................... 439/497 |
| 4,620,995 | A * | 11/1986 | Otomo et al. .............. 427/420 |
| 4,681,800 | A | 7/1987 | Zerfass et al. |
| 4,880,669 | A | 11/1989 | Dorn et al. |
| 4,900,877 | A * | 2/1990 | Dubrow et al. ............. 174/351 |
| 4,968,854 | A * | 11/1990 | Benn et al. ................. 174/354 |
| 5,447,594 | A | 9/1995 | Josefsson |
| 5,902,956 | A * | 5/1999 | Spies et al. ................. 174/358 |
| 6,247,704 | B1 | 6/2001 | Battistoni |
| 6,446,979 | B1 * | 9/2002 | Steinetz et al. ............. 277/630 |
| 6,530,577 | B1 | 3/2003 | Busby et al. |
| 6,685,197 | B1 | 2/2004 | Rakauskas |
| 6,695,320 | B2 | 2/2004 | Busby et al. |
| 6,705,594 | B1 | 3/2004 | Gierer et al. |
| 6,741,221 | B2 | 5/2004 | Aisenbrey |
| 6,870,516 | B2 | 3/2005 | Aisenbrey |

(Continued)

FOREIGN PATENT DOCUMENTS

JP 01188765 A 7/1989

*Primary Examiner*—Vishal Patel
(74) *Attorney, Agent, or Firm*—Robert L. Stearns; Dickinson Wright, PLLC

(57) ABSTRACT

A gasket and method of forming a seal between opposite surfaces of a pair of bodies. The gasket has a body with one portion having a plurality of perforations adapted for receipt between the opposite surfaces. The method of forming the seal includes disposing the portion of the body with the perforations between the opposite surfaces and fastening the pair of bodies to one another to compress the perforate portion of the body therebetween.

3 Claims, 4 Drawing Sheets

U.S. PATENT DOCUMENTS

| | | |
|---|---|---|
| 2003/0234498 A1 | 12/2003 | Busby et al. |
| 2004/0041356 A1 | 3/2004 | Smith et al. |
| 2004/0070156 A1 | 4/2004 | Smith et al. |
| 2005/0110222 A1 | 5/2005 | Matsumoto et al. |
| 2005/0134006 A1 | 6/2005 | Adams et al. |
| 2005/0167931 A1 | 8/2005 | Aisenbrey |
| 2006/0197287 A1* | 9/2006 | Farah et al. .................. 277/549 |

* cited by examiner

GASKET AND METHOD OF FORMING A SEAL THEREWITH

BACKGROUND OF THE INVENTION

1. Field of the Invention

This invention relates generally to gaskets and their method of creating seals.

2. Related Art

Gaskets are commonly used to create a seal about passages extending between bodies attached to one another, such as in internal combustions engines, for example. It is known to form gaskets from a sheet or laminated sheets of imperforate gasket body material with a generally rigid core, and a more compliant material overlaying the core to create a resilient sealing surface for abutment with the bodies. The gaskets have openings formed through the imperforate body, wherein the openings conform with the passages, thereby providing an imperforate outer periphery for establishing a seal between the mating bodies and a completely unobstructed and open fluid flow path through the passages extending between the bodies.

In an effort to reduce weight and cost, it is known to construct the core using a meshed wire material with a resilient outer sealing surface material applied over the meshed core to form a completely imperforate, solid body of gasket material. At some point, as mentioned above, openings are formed through the imperforate body, such as in a secondary operation, to provide an open path for fluid flow.

SUMMARY OF THE INVENTION

A gasket for forming a seal about at least one passage extending into opposite surfaces of a pair of bodies attached to one another has a body with a layer of perforate webbing with a portion adapted for compression between the opposite surfaces. The webbing defines a plurality of perforations in the portion compressed between the bodies to facilitate establishing the seal between the opposite sides of the bodies.

Another aspect of the invention provides a method of forming a seal between opposite surfaces of a pair of bodies having at least one fluid passage extending between the bodies. The method includes the steps of: providing a gasket body having a layer of perforate webbing; disposing the gasket body between the opposite surfaces with the perforate webbing being received between the opposite surfaces, and fastening the bodies to one another and compressing the perforate webbing of the gasket body between the opposite surfaces.

BRIEF DESCRIPTION OF THE DRAWINGS

These and other features and advantages of the present invention will become more readily appreciated when considered in connection with the following detailed description and appended drawings, wherein like features have been given like reference numerals, and wherein.

DETAILED DESCRIPTION OF THE PREFERRED EMBODIMENTS

Figure 1:
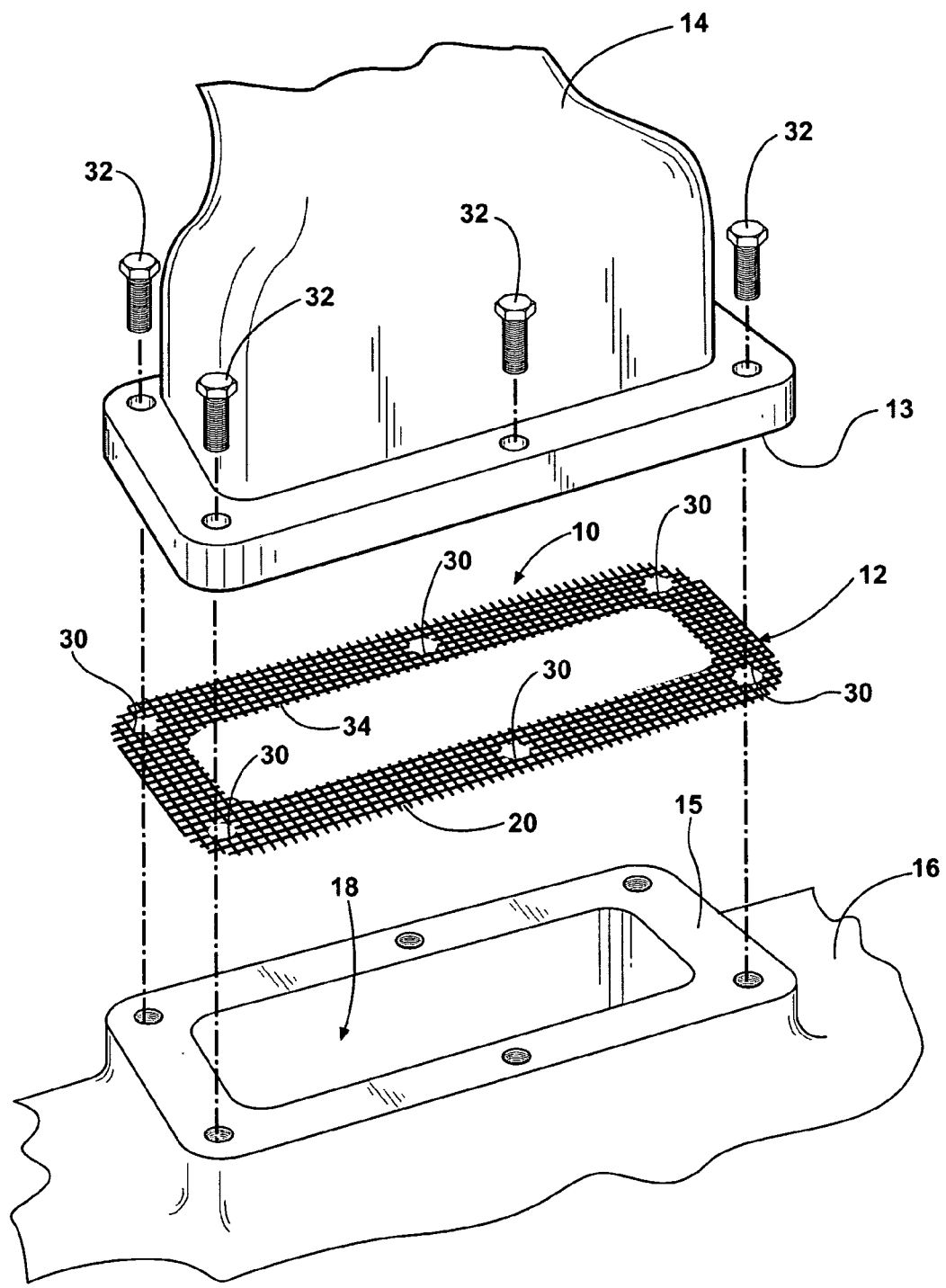
FIG. 1 is an exploded partial perspective view of a gasket constructed according to one embodiment of the invention disposed between a pair of bodies to create a seal therebetween.
Figure 2:
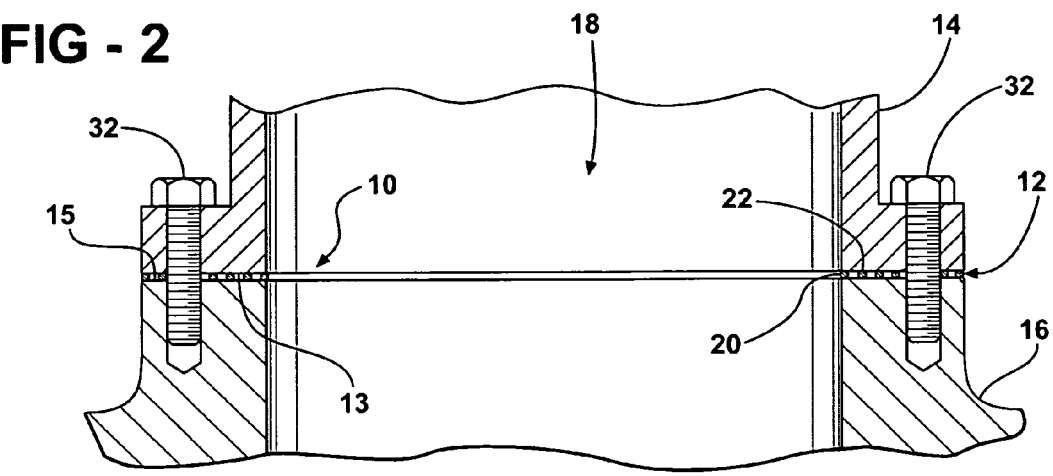
FIG. 2 is an assembled cross-sectional view of the bodies with the gasket forming a seal therebetween.

Referring in more detail to the drawings, FIGS. 1 and 2 show a gasket 10 constructed according to one presently preferred embodiment of the invention having a body 12 at least partially compressed between opposite surfaces 13, 15 of a pair of bodies 14, 16 to form an assembly, such as, by way of example and without limitations, a thermostat for an internal combustion engine. To body 12 has one portion adapted for compressed receipt between the opposite surfaces 13, 15, and defines another region or portion adapted to allow fluid to flow generally unobstructed through at least one passage 18 extending into the opposite surfaces 13, 15 between the bodies 14, 16. The portion compressed between the opposite surfaces 13, 15 comprises at least one layer of perforate webbed material or webbing 20 defining a plurality of perforations or voids 22 to facilitate establishing the seal between the opposite sides 13, 15 of the pair of bodies 14, 16.

The one or more layers of perforate webbing 20 can be formed separately from one another or together from one or more different types of material, either separately or in combination with one another, such as rubber or other polymeric materials, metallic materials, paper based materials, and various fibrous or ceramic materials, for example. Accordingly, the body 12 can be constructed via a multitude of manufacturing processes, either separately or in succession with one another, such as molding, weaving, stamping, blanking, and embossing, for example.

The shapes and sizes of the plurality of voids 22 defined by the webbing 20 can be varied to best meet the application sealing requirements. For example, the voids can be circular, rectangular, triangular, oval, or polygonal, and can range from microns to millimeters in size. Preferably, the portion of the body 12 establishing the seal between the opposite sides 13, 15 is constructed having a uniform pattern of webbing, and thus, a uniform pattern of voids 22 having substantially the same size and shape across the body 12. As such, the manufacturing efficiencies can be maximized, and the costs associated with the manufacturing process can be minimized. However, it should be recognized that the portion of the body 12 establishing the seal could be constructed having a non-uniform pattern of webbing 20, and thus, the voids 22 could vary in size and/or shape across the body 12, if better suited for the intended application.

The voids 22 provide a more uniform compression of the webbing 20 by allowing the webbing 20 to be elastically and possibly plastically displaced laterally under load into the void area, thus facilitating the formation of a uniform seal between the opposite surfaces 13, 15. Further, the voids 22 reduce the surface area of the gasket body 12 being compressed, and thus, the unit loading on the gasket body 12 is increased from that of known gaskets. Also, the voids 22 define redundant containment zones to prevent fluid from leaking past the entire gasket body 12 should any one of the webs defining an individual void 22 be damaged or broken. Accordingly, if one web is ruptured, adjacent voids defined by undamaged webs can still contain fluid from leaking, thereby inhibiting a leak past the gasket body 12. This same aspect is particularly useful in establishing a reliable seal between surfaces that have some degree of damage, such as gouges or scratches, for example, or between surfaces having high porosity, such as commonly exists in surfaces of cast materials, for example. In addition, any fluid captured in the area of the voids 22, such as may be incorporated during assembly by disposing a sealing fluid therein, or by having fluid enter therein during use, can also facilitate forming a reliable seal between the surfaces 13, 15. The fluid within the voids 22 can act as a hydrostatic seal of sorts, thus, preventing the egress or ingress of fluid and/or contamination between the bodies 14, 16.

Figure 3:
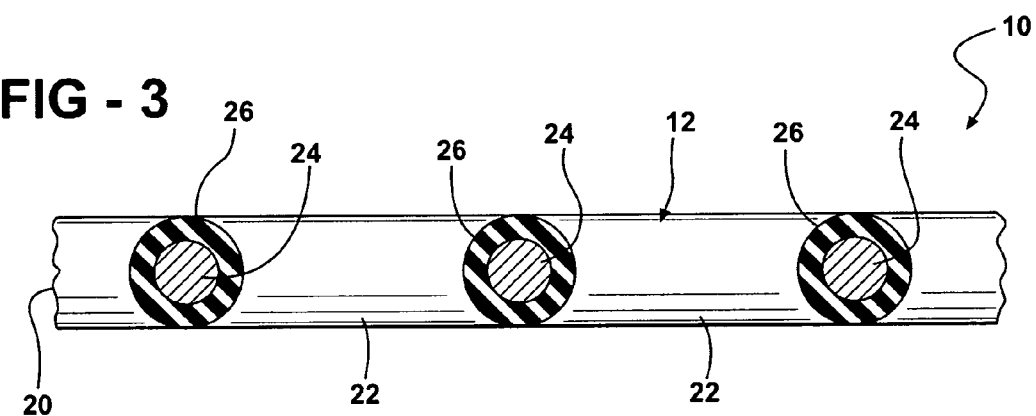
FIG. 3 is an enlarged partial cross-sectional view of the gasket of FIG. 1.
Figure 4:
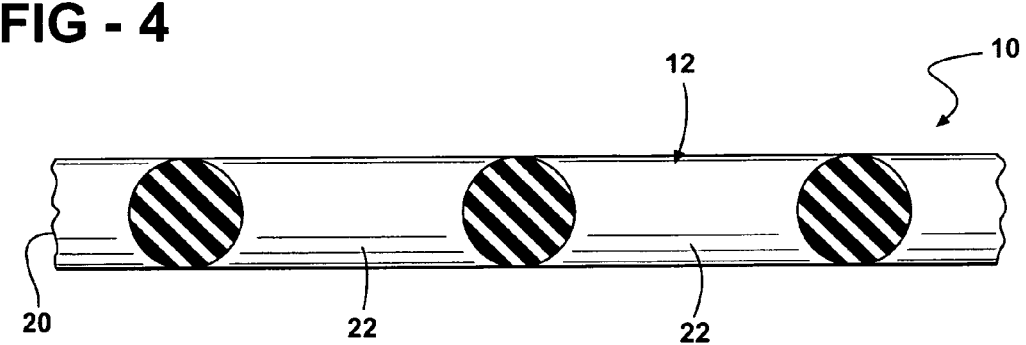
FIG. 4 is an enlarged partial cross-sectional view of a gasket constructed according to another presently preferred embodiment of the invention.
Figure 5:
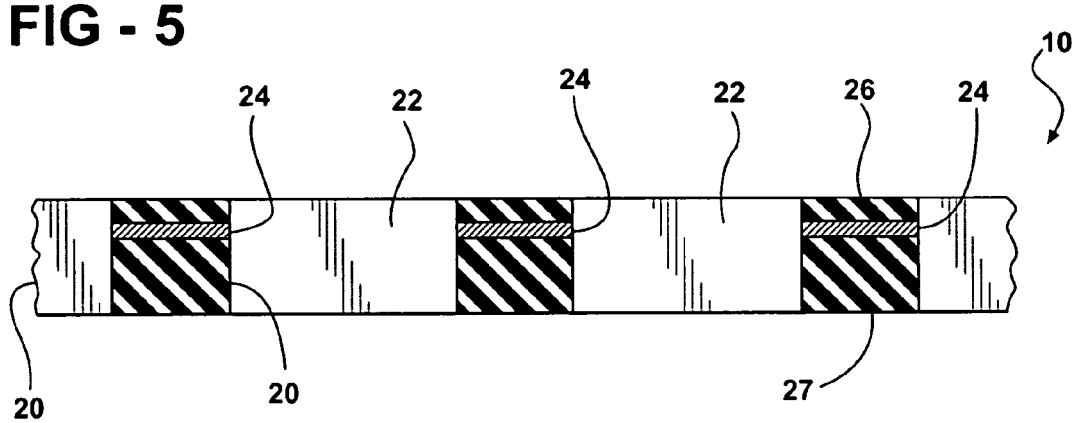
FIG. 5 is an enlarged partial cross-sectional view of a gasket constructed according to yet another presently preferred embodiment of the invention.
Figure 6:
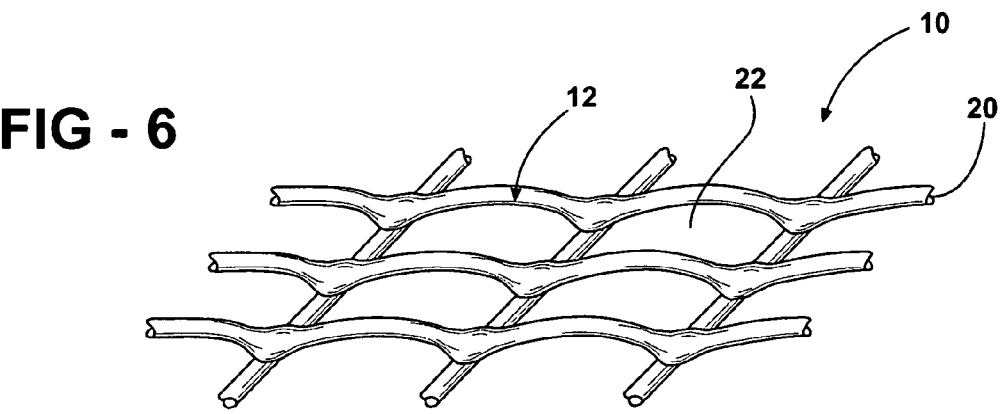
FIG. 6 is an enlarged partial perspective view of a gasket constructed according to yet another presently preferred embodiment of the invention.

As mentioned, the gasket body 12 can be constructed utilizing various materials and patterns of webbing. For example, FIG. 3 shows a body 12 constructed from two different materials, wherein the body 12 has a core 24 of a first material, for example, a layer of metallic wire screen mesh, and an outer layer 26 of a second material, for example, a layer of polymeric material, such as rubber. The polymeric outer layer 26 could be applied to the core 24 in various ways, such as molding or spray coating, for example, wherein the outer layer 26 is shown here as fully encapsulating the core 24. In another example, FIG. 4 shows a body 12 constructed form a single material, for example, a single layer of resilient polymeric material, such as rubber. The single layer is shown, by way of example and without limitations, as having webbing 20 that is generally circular in cross-section, though it should be recognized that the webbing 20 could be constructed having any suitable shape in cross-section. In yet another example, FIG. 5 shows a body 12 constructed from at least two different materials, wherein the body 12 has a core 24 of a first material, for example, a generally rigid material, such as a generally flat layer of metallic material, and a pair of opposite second outer layers 26, 27 of material, for example, less rigid, more compressive and resilient layers of polymeric material. It should be recognized that the core 24 and outer layers 26, 27 could be formed from any suitable gasket material, and layered having any suitable number of layers with varying thicknesses, as desired. Further, the outer layers 26, 27 could be formed of different materials, such that one outer layer 26 could be formed from one resilient polymeric material, while the other outer layer 27 could be formed from a different resilient polymeric material, for example. Additionally, it should be recognized that the core 24 could be covered on a single side (not shown), such that in this example, one side would have the metal core 24 exposed, while the other side would have the more resilient layer exposed. In this example, the layers of material are shown having a rectangular or square shape in cross-section, wherein the outer layers 26, 27 do not fully encapsulate the core 24, such that the core 24 is exposed within the voids 22. In yet another example, FIG. 6 shows a body 12 having a layer of metallic webbing 20 formed via an embossing process. As mentioned above, the webbing 20 could be arranged in other configurations than as shown, thereby defining voids 22 having the shape and size desired.

As shown in FIG. 1, the gasket 10 can have a plurality of openings 30 formed therein to facilitate receipt of fasteners 32 used to attach the bodies 14, 16 to one another. However, it should be recognized that though the openings 30 may be desirable in some applications, the formation of openings 30 may not be necessary. This results from the ability of the fasteners 32 to readily form openings through the gasket body 12 by pushing the fasteners 32 therethrough. This is facilitated by the plurality of voids 22 in the gasket body 12, wherein the force applied to the fasteners 32 can readily form an opening through the webbing 20 without causing damage to the gasket body 12. Accordingly, the gasket body 12 can be constructed without the openings 32 formed therein, thereby reducing the overall cost to manufacture the gasket 10, if desired.

As shown in FIGS. 1 and 2, gasket body 12 has a region or portion defining an opening 34 radially inwardly from the one portion of webbing 20 corresponding with the passage 18. The opening 34 is shown as being shaped to conform with the passage 18, and thus, the webbing 20 generally does not extend into the passage 18. As such, fluid is allowed to flow completely unobstructed through the passage 18. It should be recognized that the number and shape of the openings formed in the gasket body 12 can be varied to correspond with the number and shape of the passages extending between the bodies 13, 15.

Figure 7:
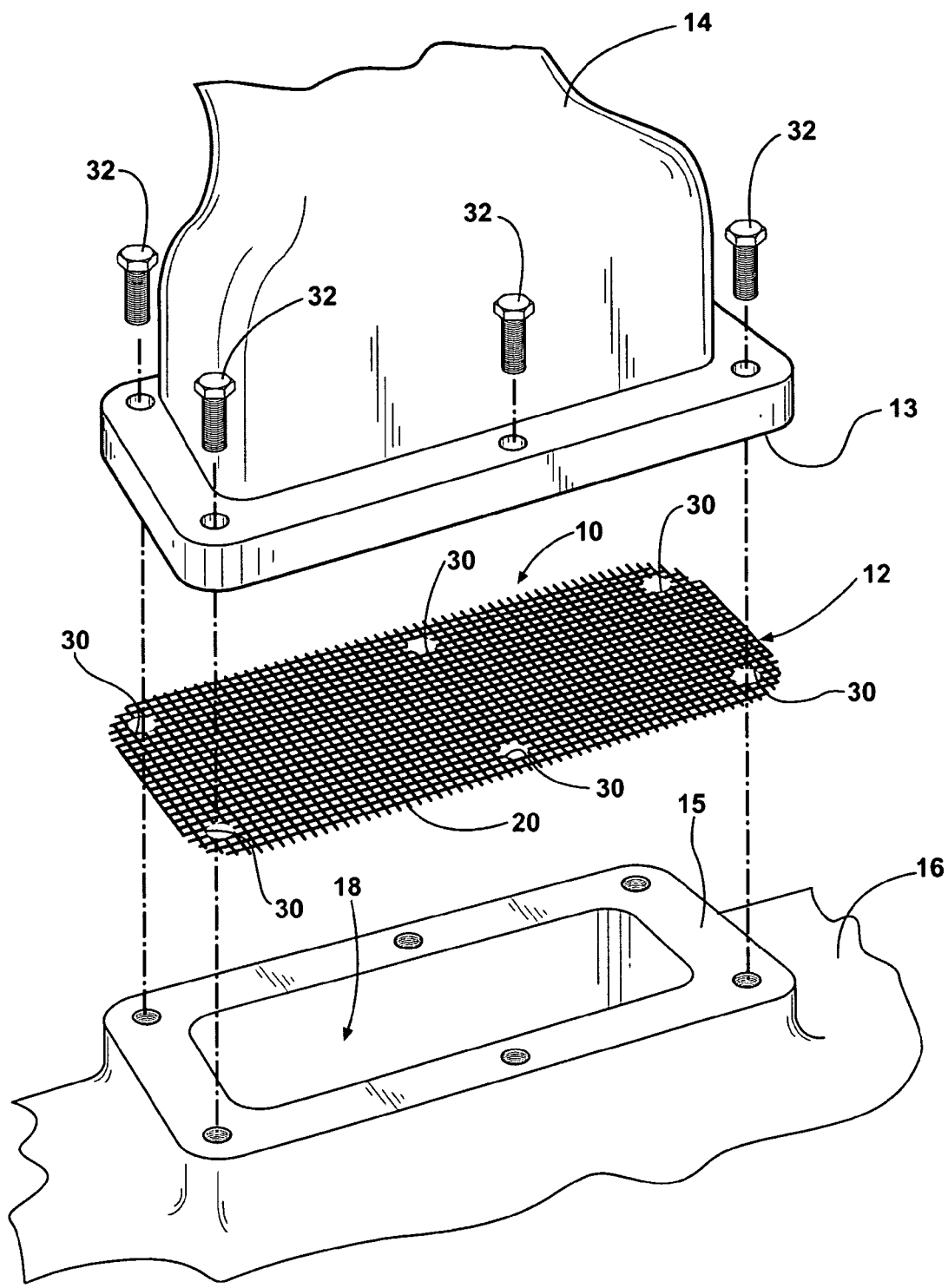
FIG. 7 is view similar to FIG. 1 showing a gasket constructed according to another embodiment of the invention disposed between the pair of bodies to create a seal therebetween.
Figure 8:
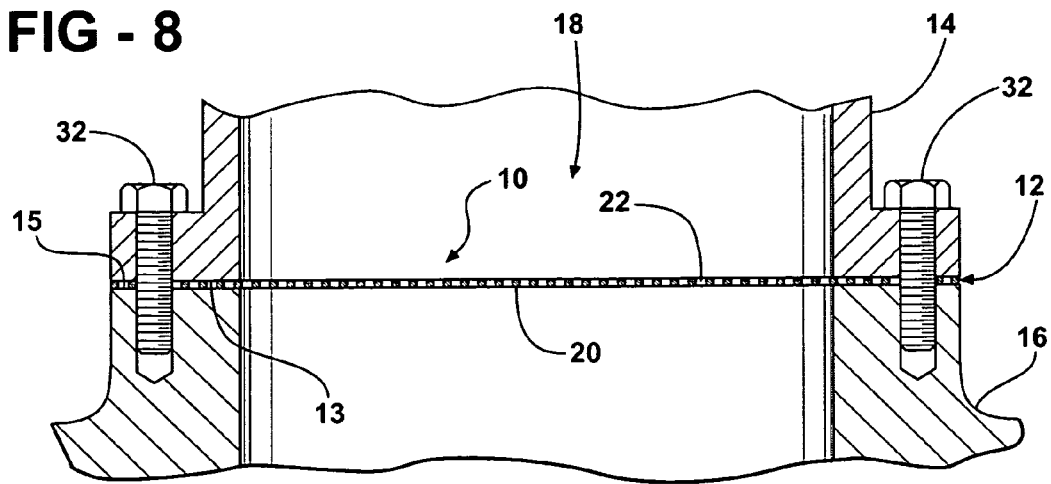
FIG. 8 is a view similar to FIG. 2 showing the gasket of FIG. 7 forming a seal between the bodies.

As shown in FIGS. 7 and 8, a gasket 10 constructed according to another embodiment of the invention has one portion, represented here as an outer periphery, for example, at least partially compressed between the opposite surfaces 13, 15, and another portion adapted to traverse at least partially, and represented here as extending completely across the fluid passage 18. It should be recognized that this embodiment is only useful in applications not having mechanical apparatus, such as pistons, for example, traversing the passage 18. Preferably, the two portions of the gasket 10 are constructed from the same webbed material with voids 22 of uniform shape and size. The voids 22 in the portion traversing the passage 18 are sized to allow fluid to flow generally unobstructed through the passage 18. Accordingly, the gasket 10 does not require a separate opening conforming to the size of the passage 18 to be formed therein. As such, the gasket 10 can be used universally across a variety of applications having one or more passages, regardless of the sizes and shapes of the passages. In addition, the gasket 10 manufacturing efficiencies are maximized as a result of not having to form separate openings.

If an application requires a specific fluid flow rate through the passage 18 and a specific compression of the portion of the gasket body 12 compressed between the bodies 14, 16, the voids 22 traversing the passage 18 could be sized differently than the voids 18 compressed between the mating surfaces 13, 15. As such, the outer periphery of the gasket body 12 could be constructed have one pattern of webbing to provide the seal integrity needed, while the portion of the body 12 extending across the passage 18 could have a different pattern of webbing to provide the size and shape of voids 22 best suited to achieve the desired fluid flow rate. Otherwise, the gasket 10 can be constructed the same as described of above in the previous embodiments.

Obviously, many modifications and variations of the present invention are possible in light of the above teachings. It is, therefore, to be understood that within the scope of the appended claims, the invention may be practiced otherwise than as specifically described.

What is claimed is:

1. A gasket for forming a seal about at least one passage extending into opposite surfaces of a pair of bodies attached to one another, comprising:
   a body having one portion adapted to be compressed between the opposite surfaces of the pair of bodies, said one portion comprising a layer of wire mesh defining a network of uniformly spaced perforations adjacent one another and having an outer coating of elastomeric material encapsulating said wire mesh and not closing said perforations and having a plurality of fastener openings distinct from said perforations.

2. The gasket of claim 1 wherein said perforations are substantially the same size and shape.

3. The gasket of claim 1 wherein said body defines at least one open region radially inwardly from said one portion, said at least one open region being sized to conform with said at least one passage.

* * * * *